(12) United States Patent
Scolari (10) Patent No.: US 11,375,730 B2
(45) Date of Patent: Jul. 5, 2022

(54) ROASTING METHOD AND APPARATUS (71) Applicant: Scolari Engineering S.P.A., Milan (IT)

(72) Inventor: Carlo Scolari, Milan (IT)

(73) Assignee: Scolari Engineering S.P.A.

( * ) Notice: Subject to any disclaimer, the term of this patent is extended or adjusted under 35 U.S.C. 154(b) by 298 days.

(21) Appl. No.: 15/758,775

(22) PCT Filed: Dec. 1, 2016

(86) PCT No.: PCT/IB2016/057261
§ 371 (c)(1),
(2) Date: Mar. 9, 2018

(87) PCT Pub. No.: WO2017/093929
PCT Pub. Date: Jun. 8, 2017

(65) Prior Publication Data
US 2018/0279639 A1 Oct. 4, 2018

(30) Foreign Application Priority Data

Dec. 3, 2015 (IT) .......................... UB2015A006318

(51) Int. Cl.
*A23F 5/04* (2006.01)
*A23N 12/12* (2006.01)
*A23N 12/08* (2006.01)

(52) U.S. Cl.
CPC ................ *A23F 5/04* (2013.01); *A23N 12/08* (2013.01); *A23N 12/125* (2013.01)

(58) Field of Classification Search
CPC . A23F 5/04; A23F 5/042; A23F 5/046; A23N 12/08; A23N 12/125; A23N 12/083;
(Continued)

(56) References Cited

U.S. PATENT DOCUMENTS

| 4,602,147 A | 7/1986 | Gell |
| 6,260,479 B1 | 7/2001 | Friedrich et al. |

(Continued)

FOREIGN PATENT DOCUMENTS

| CA | 2304324 A1 | 9/2000 | |
| EP | 3032968 B1 * | 1/2020 | ............. A23N 12/08 |
| WO | 2013/108283 A1 | 7/2013 | |

OTHER PUBLICATIONS

Integral NPL, published Jan. 20, 2013, https://web.archive.org/web/20130120060033/https://www.mathsisfun.com/calculus/integration-definite.html (Year: 2013).*

*Primary Examiner* — Drew E Becker
*Assistant Examiner* — Bryan Kim
(74) *Attorney, Agent, or Firm* — Husch Blackwell LLP (57) ABSTRACT

A method and an apparatus for roasting a food product including: loading a batch of a predetermined food product type in a roasting device; setting operating parameters of the roasting device according to initial reference values for the predetermined food product type; performing feedback control during the heating of the product by obtaining, instant by instant, a value for a sound quantity which is relative to a sound emitted by the product, the sound being detected in a frequency range including both human ear audible and ultrasound frequencies; comparing the sound quantity's value obtained at each instant to a value taken by the sound quantity at such instant in a roasting curve of sound quantity versus time associated with the predetermined food product type; and adjusting, instant by instant, the operating parameters of the roasting device depending on the result of the comparison.

16 Claims, 3 Drawing Sheets

(58) Field of Classification Search
CPC ........... A23N 12/10; A23N 12/12; A23L 5/13; A23L 5/15; A23L 5/17; A23L 25/20; A23L 25/40; A47J 31/42; A23P 30/30; A23P 30/38; H05B 6/46; H05B 6/48; H05B 6/50
See application file for complete search history.

(56) References Cited

U.S. PATENT DOCUMENTS

| | | | |
|---|---|---|---|
| 7,285,300 B1* | 10/2007 | Allington | A23N 12/08 |
| | | | 426/233 |
| 10,039,307 B2* | 8/2018 | Wilson | A23N 12/125 |
| 2004/0142078 A1* | 7/2004 | Eichner | A23F 5/046 |
| | | | 426/466 |
| 2016/0120211 A1* | 5/2016 | Wilson | A23N 12/125 |
| | | | 426/233 |
| 2017/0164634 A1* | 6/2017 | Tan | A23N 12/08 |

* cited by examiner

ROASTING METHOD AND APPARATUS

CROSS REFERENCE TO RELATED APPLICATIONS

This application is a U.S. National Phase Application of International Application No. PCT/IB2016/057261 filed on Dec. 1, 2016, which claims the benefit of priority from Italian Patent Application UB2015A006318 filed on Dec. 3, 2015. The disclosures of International Application No. PCT/IB2016/057261 and Italian Patent Application UB2015A006318 are incorporated herein by reference.

The present invention refers to a method and to an apparatus for roasting a food product, in particular coffee.

U.S. Pat. No. 6,260,479 discloses a method for roasting coffee based on the phenomenon of popping or cracking to which coffee beans are subjected during a roasting process in which the coffee beans are subjected to pyrolysis. In particular, this document observes that the sound that accompanies the roasting of coffee can be divided into three phases: a background sound that occurs at the start of heating of the batch of coffee until the first crack sound occurring at the start of the pyrolysis process; an interim period of a reduced level of sound, between the first and the second crack; and a second crack sound of increased level when the pyrolysis is at its peak. U.S. Pat. No. 6,260,479 also observes that the first crack sound and the second crack sound are of greater intensity than the sound of the interim period. Moreover, in a band of human ear audible frequencies, variable from about 971 to about 9.172 Hz, this document observes that as the frequency increases, the distinction between the level of the sound of the interim period and the level of the sounds of first and second crack increases. Based on these observations, U.S. Pat. No. 6,260,479 describes a method for roasting coffee comprising the steps of: loading a batch of coffee beans to be roasted in a roasting chamber; subjecting the batch to a hot air flow so as to bring the coffee beans to pyrolysis; establishing the point at which the pyrolysis of the batch begins through analysis of the cracking sound generated by the coffee beans to identify the first occurrence of the sound that is indicative of the start of the pyrolysis; once the start of the pyrolysis has been established, activating a timer for a predetermined time period; at the end of the predetermined time period, generating an output signal to end the roasting process and unloading the roasted coffee from the roasting chamber.

The technical problem of the invention is that of providing a method and an apparatus that make it possible to improve the roasting process of a food product like, for example, coffee. In particular, an objective of the invention is to make, at the industrial level, the roasting process extremely accurate and reliable so as to ensure that an excellent quality roasted product is obtained.

The Applicant has found that the aforementioned technical problem can be solved through a roasting method according to claim 1, as well as an apparatus according to claim 14.

In particular, in a first aspect thereof the present invention concerns a method for roasting a food product comprising the steps of:
- loading a batch of a predetermined food product type in a roasting device;
- setting operating parameters of the roasting device according to initial reference values for said predetermined food product type, so as to start a heating of the product, adapted to bring the product to roasting;
- performing a feedback control for the operation of the roasting device during the heating of the product, by means of the steps of:
  - obtaining, instant by instant, a value for a sound quantity which is relative to a sound emitted by the product, wherein said sound is detected in a frequency range comprising both human ear audible frequencies and ultrasound frequencies;
  - comparing the sound quantity's value, which is obtained at each instant, to a value taken by the sound quantity, at said instant, in a roasting curve of said sound quantity versus time, which is associated with said predetermined food product type;
  - adjusting, instant by instant, the operating parameters of the roasting device depending on the result of said comparison.

In a second aspect thereof, the present invention concerns an apparatus for roasting a food product comprising:
- a roasting device adapted for receiving a batch of a predetermined food product type to be roasted, the roasting device comprising a sound sensor operating in a frequency range comprising both human ear audible frequencies and ultrasound frequencies;
- a control device for adjusting the operation of the roasting device by acting on operating parameters of the roasting device;
- a database adapted for storing, for each of a plurality of product types, a respective roasting curve of a sound quantity versus time, and respective initial reference values for said operating parameters;

wherein the control device is configured to:
- initially set said operating parameters according to the respective initial reference values, which are associated to said predetermined food product type in said database, so as to start a heating of the product adapted to bring the product to roasting; and
- perform a feedback control of the operation of the roasting device during the heating of the product:
  - by obtaining, instant by instant, a value for a sound quantity of a sound emitted by the product, said sound being detected by said sound sensor;
  - by comparing the sound quantity's value, which is obtained at each instant, to a value taken by the sound quantity, at said instant, in the respective roasting curve of said sound quantity versus time, which is associated to said predetermined food product type in said database; and
  - by adjusting, instant by instant, the operating parameters of the roasting device depending on the result of said comparison.

The dependent claims are relative to preferred characteristics of the invention.

In at least one of the aforementioned aspects, the invention comprises one or more of the following preferred characteristics that are described hereinafter. Preferably, the heating of the product is carried out by exposing the product to a hot air flow.

Preferably, said operating parameters of the roasting device comprise at least one of: hot air temperature and hot air flow speed.

Preferably, the roasting device comprises a reactor inside which the product is loaded and said operating parameters comprise at least one of: hot air temperature, hot air flow speed and rotation speed of at least one rotating member of the reactor. The rotating member can be a rotating drum or mixing blades inside an external stator of the reactor.

Preferably, said sound quantity is indicative of the amplitude of the sound emitted by the product. For example, it is indicative of the sound pressure or intensity of the sound emitted by the product.

In a preferred embodiment, it is provided a step of obtaining, instant by instant, the frequency of the sound emitted by the product and of identifying the type of food product based on the frequency obtained over time.

Preferably, it is provided a step of verifying that the comparison of the value of the sound quantity is carried out based on a roasting curve of said sound quantity versus time, which is actually associated with the type of food product identified.

In a preferred embodiment, the step of performing a feedback control of the operation of the roasting device during the heating of the product also comprises the steps of:
 obtaining, instant by instant, a value for a temperature which is indicative of the temperature reached by the product during the heating;
 comparing the temperature's value, which is obtained at each instant, to a value taken by the temperature, at said instant, in a roasting curve of temperature versus time, which is associated with said predetermined food product type,
wherein the step of adjusting, instant by instant, the operating parameters of the roasting device is also carried out depending on the result of said comparison on the value of the temperature.

In a preferred embodiment, the step of performing a feedback control of the operation of the roasting device during the heating of the product also comprises the steps of:
 determining, instant by instant, a value for the sound energy which is released by the product up to that instant;
 comparing the sound energy value, which is obtained at each instant, to a value taken by the sound energy, at said instant, in a roasting curve of sound energy versus time, which is associated with said predetermined food product type, and
wherein the step of adjusting, instant by instant, the operating parameters of the roasting device is also carried out based on the result of said comparison on the sound energy value.

In a preferred embodiment, the step of performing a feedback control of the operation of the roasting device during the heating of the product also comprises the steps of:
 determining, instant by instant, a value which is indicative for the heat transferred to the product up to that instant;
 comparing the indicative value, which is determined at each instant, to a value taken by the transferred heat, at said instant, in a roasting curve of transferred heat versus time, which is associated with said predetermined food product type, and
wherein the step of adjusting, instant by instant, the operating parameters of the roasting device is also carried out based on the result of said comparison on the value indicative of the transferred heat.

Preferably, the product is made up of coffee beans or barley grains or nut pieces. In an embodiment, a batch of a mixture of at least two types of food product is loaded in the roasting device. In this case, the operating parameters of the roasting device are preferably set according to reference values associated with said mixture. Moreover, the aforementioned comparison operations are preferably carried out based on roasting curves associated with said mixture.

Preferably, once the product is roasted, it is provided to store in a database the values obtained or determined, instant by instant, of the sound quantity and/or of the temperature and/or of the sound energy and/or of the transferred heat and to associate them with said predetermined type (or mixture) of food product as roasting curves of sound quantity and/or temperature and/or sound energy and/or transferred heat.

Preferably, once the product is roasted, it is provided to store in a database the adjustments made, instant by instant, of the operating parameters of the roasting device and to associate them with said predetermined type (or mixture) of food product as predetermined reference values for said operating parameters.

The roasting device can comprise at least one second sound sensor operating in a frequency range comprising both human ear audible frequencies and ultrasound frequencies.

Further characteristics and advantages of the present invention will become clearer from the following detailed description of some preferred embodiments thereof, made with reference to the attached drawings. The different characteristics in the single configurations can be combined as desired according to the previous description, if it was wished to exploit the advantages deriving specifically from a particular combination.

Figure 1:
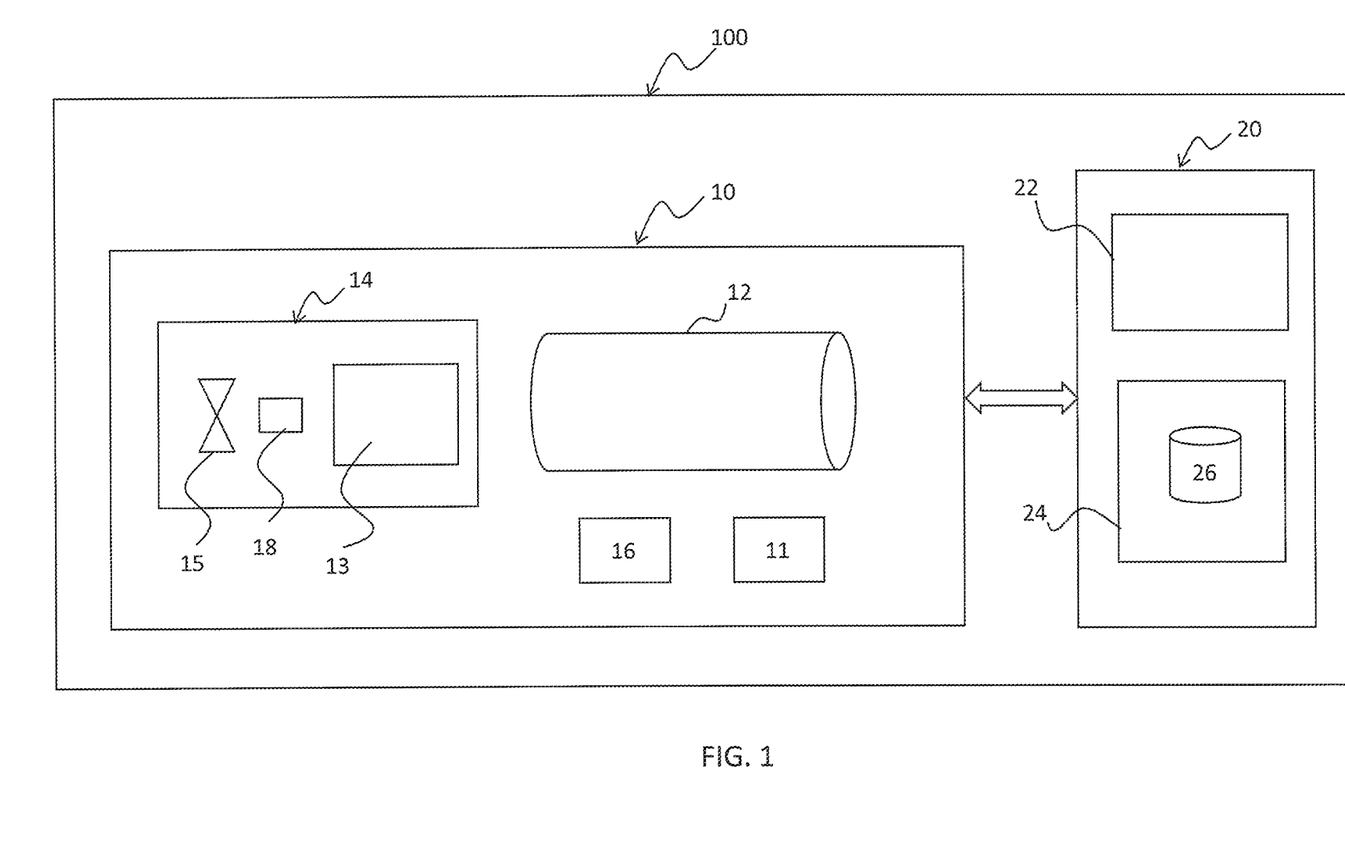
FIG. 1 schematically shows a roasting apparatus according to an embodiment of the invention.

In such drawings,

FIG. 1 shows an apparatus 100 for roasting a food product like, for example, coffee, barley, nut pieces and other similar products, adapted for being subjected to roasting.

Even if hereinafter reference will be made, in particular, to the roasting of coffee, the teachings of the invention can also apply to other food products.

The apparatus 100 comprises a roasting device 10 and a control device 20.

The roasting device 10 comprises a reactor 12 and a hot air flow generator 14 comprising a burner 13, a fan 15 and a cyclone 18 adapted for filtering the air entering the reactor 12. The reactor 12 is adapted for housing a batch of coffee beans to be roasted. In the embodiment illustrated in FIG. 1, the reactor 12 comprises a rotating drum. Preferably, the rotating drum 12 is equipped with fins (not illustrated) to promote the mixing of the coffee beans during roasting. Alternatively, the reactor 12 can be of the static type, in other words without mobile elements, in which the coffee beans are moved only thanks to the hot air flow, or it can be equipped with a cylindrical outer stator and with rotating inner mixing blades, adapted for moving the coffee beans.

The hot air flow generated by the hot air flow generator 14 is conveyed, in a suitable manner, inside the reactor 12.

The device 10 also comprises a temperature sensor 11 and at least one sound sensor. In the illustrated embodiment, the device 10 comprises two sound sensors 16, for example a microphone and an accelerometer.

The two sound sensors 16 are adapted for detecting sounds in a frequency range that comprises both human ear audible frequencies and ultrasound frequencies. Preferably, the two sound sensors 16 have a maximum frequency less than or equal to 50 KHz. Preferably, the frequency range is comprised between 0 Hz and 50 KHz. Preferably, the two sound sensors 16 have a linear frequency response from about 20 Hz up to about 50 KHz. Moreover, they are capable of withstanding operating temperatures of up to 70-120° C.

Once the coffee beans are loaded in the reactor 12, the hot air flow conveyed therein hits the coffee beans that are thus subjected to a heating process adapted for roasting the coffee.

The roasting process is carried out under the control of the control device 20.

The roasting process is a very delicate and complex process that requires fine and continuous control of operating parameters of the device 10 to ensure that the roasted product satisfies desired characteristics in terms, for example, of aroma, colour and flavour. Such operating parameters are, for example, the hot air temperature heated by the burner 13, the rotation speed of the rotating drum or of the mixing blades of the cylindrical external stator of the reactor 12 and the speed of the hot air flow generated by the fan 15. They can, therefore, be adjusted by intervening on the burner 13, on the actuation motor (not shown) of the rotating drum or of the mixing blades and on the fan 15.

For example, the temperature of the air heated by the burner 13 can be comprised between 380 and 650° C. so as to obtain final temperatures comprised between 200 and 240° C. for the coffee beans heated in the reactor 12. The speed of the hot air flow generated by the fan 15 can be comprised between 0.5 and 12 metres/second.

The control device 20 comprises, for example, a PLC 22 (programmable logic controller), a computer 24 (such as a PC) and a database 26 (which can be stored in the PC). The computer 24 preferably has a graphical interface (not shown) to allow a user to input commands and/or data and display information. The PLC is adapted for adjusting the operating parameters of the device 10 by means of a PID (Proportional-Integral-Derivative) control system.

The Applicant observes that the cellular structure of coffee beans varies in accordance with the variation of the genetic characteristics, linked to the genus, species and variety of coffee, of the agronomic characteristics, linked to the climatic cultivation conditions, and of the characteristics of the post-harvesting and drying processes. The result is that coffee beans belonging to different types of coffee can differ from each other in shape, mass, density, chemical composition, moisture percentage and other similar properties; where the expression "type of coffee" means a set of characteristics that defines the cellular structure of the bean. Given that it is a plant product, it is nevertheless clear that coffee beans belonging to the same type of coffee will still have slight differences, due for example to different sun exposure in the same coffee plant.

As a result coffee beans belonging to different types or mixtures of coffee react differently to heat such that—during the roasting process—they need to be roasted according to different roasting curves of temperature versus time, each specifically studied to best roast the coffee beans according to their cellular structure.

It is therefore necessary to roast coffee beans according to different temperature curves depending on the type or mixture of coffee to which the beans belong.

Figure 3:
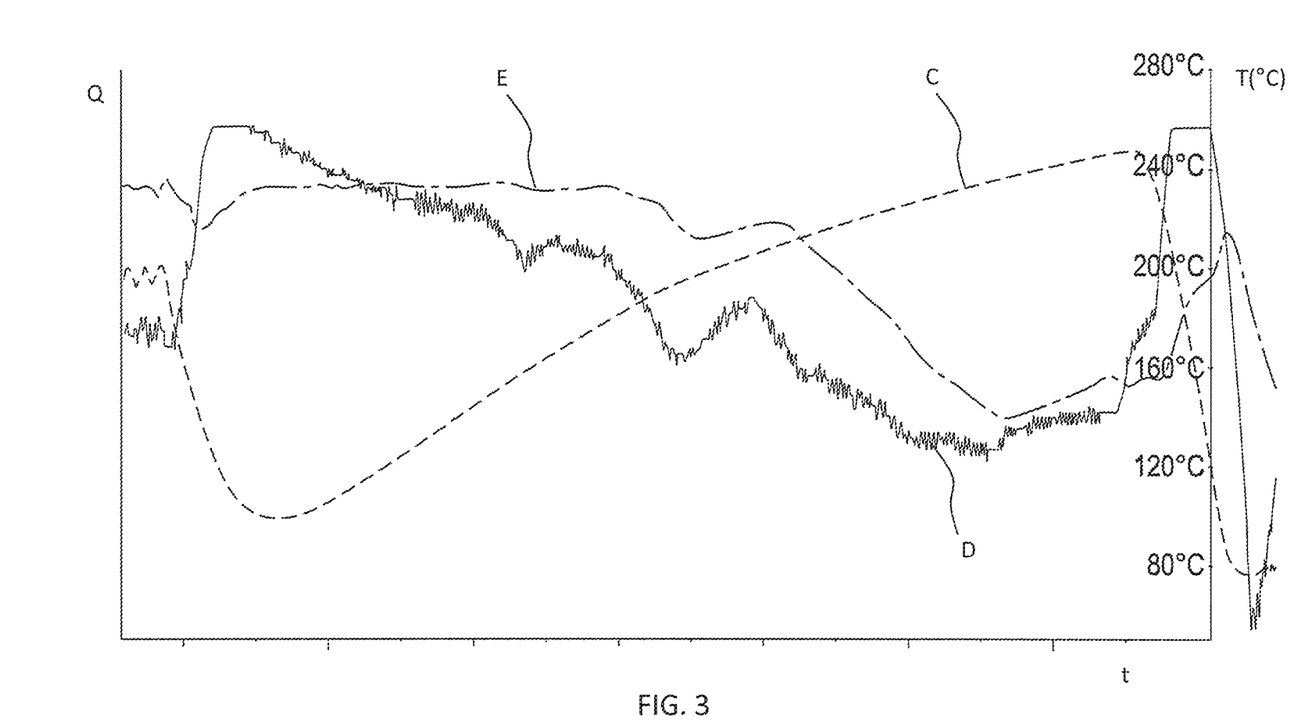
FIG. 3 shows three examples of curves, two of temperature versus time and one of heat power of the burner versus time.

An example of roasting curve of temperature (° C.) versus time t (in seconds) is shown in FIG. 3, curve C, where the temperature detected by the temperature sensor 11 during a roasting process started indicatively at t=0 sec, and ending indicatively at t=660 sec, is given.

In this context, the Applicant observes that the control of a roasting process of coffee carried out only based on temperature curves can be inadequate in some situations. Indeed, the temperature that is detected by the temperature sensor 11 is given both by the hot air temperature that hits the coffee beans and by the temperature of the coffee beans themselves, which is lower than that of the hot air. As a result, in the case of a decrease in hot air flow (for example due to clogging of the cyclone 18), the temperature detected by the temperature sensor 11 approaches the real one of the coffee (in other words, it is lower than that measured in the presence of the complete hot air flow). Therefore, an automatic control of the roasting process based on only the temperature curve, detecting a lowering of temperature, would, in this situation, lead to increasing the temperature of the burner 13 to bring the temperature detected by the temperature sensor 11 to that expected according to the temperature curve. This could be very dangerous because it would lead to an undue increase of the temperature of the coffee beans which could—for example in an exothermic step of the roasting process—lead to set the product on fire with subsequent explosion of the reactor 12.

The Applicant also observes that the control of the roasting process of coffee carried out only based on temperature curves could be not unequivocally accurate. Indeed, the temperature—despite being a fundamental magnitude for the triggering of the chemical transformation of the coffee beans—is not indicative of the actual evolution of their chemical transformation. As a result two batches of coffee beans labelled as belonging to the same type of coffee, but in reality having different cellular structures (for example because they come from two different harvests), would still be roasted according to the same temperature curve. This could lead to two very different roasting results (for example one batch could be dried but not roasted) and, in any case, to unsatisfactory roasting results (for example in terms of aroma and flavour).

By analysing the sound emitted by the coffee beans during a roasting process in a frequency range comprising both audible frequencies and ultrasound wave frequencies, the Applicant has found that the typical noise produced is the result of numerous impulsive phenomena lasting a very short time and characterised by spectral emission of the "white" type. It is therefore possible to discern only the events due to the roasting process, minimising the effects of plant noise, limiting the observation band to frequencies for which the signal/noise ratio is extremely advantageous. In particular, the Applicant has found that as well as the sounds of the first and second pop (or crack) quoted in the literature and detectable in a frequency range audible by the human ear, there is a continuous emission of sounds detectable during the entire roasting process. This is shown, as an example, in FIG. 2 where the curve A' shows an example of sound pressure P (Pascal) versus t (in seconds), that has been obtained (as explained in detail hereinafter) by detecting—in a frequency range comprised between 0 Hz and 50 KHz—the sound emitted by the coffee beans during a roasting process, indicatively starting at a temperature of 120° C. and a time t=0 sec. and ending at about 220° C. and t=660 sec.

Figure 2:
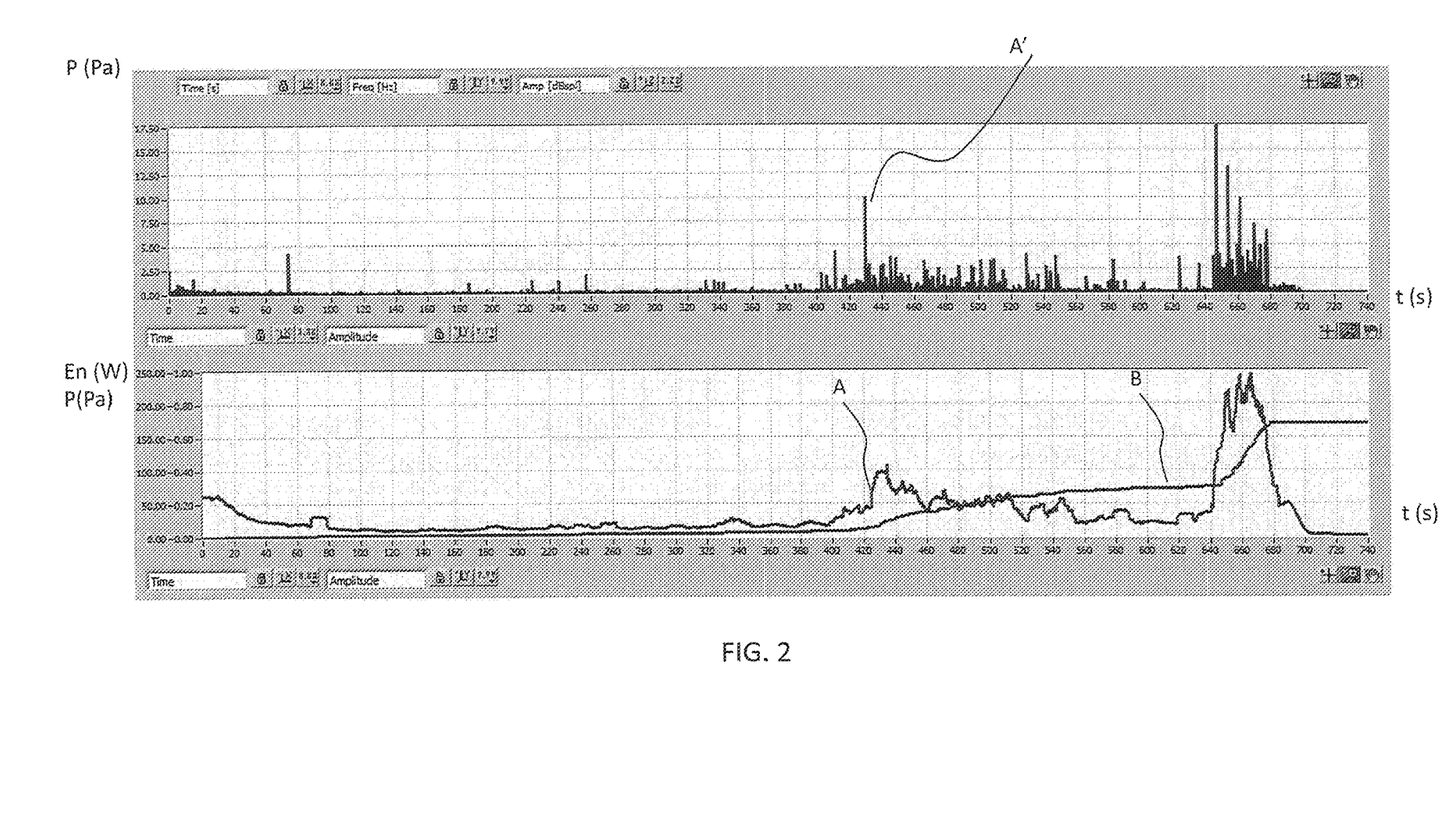
FIG. 2 shows three examples of curves, two of sound pressure versus time and one of sound energy versus time.

As can be seen from the curve A' of FIG. 2, as well as the sounds of first and second pop, at t=420 sec. and t=660 sec. respectively, there is a sound emission detectable during the entire roasting process that can, therefore, be used as control variable for a continuous control of the roasting process.

In particular, considering that the sound emitted over time by the coffee beans is indicative of the evolution of the chemical transformation of the coffee beans, the Applicant has found that by controlling, instant by instant, the roasting process of the coffee based on such a sound it is possible to roast the coffee in an extremely accurate and reliable manner, taking into account the chemical transformation that, instant by instant, is actually happening in the coffee beans.

In the aforementioned example of clogging of the cyclone 18 or of anomalous operation of the temperature sensor 11, this makes it possible, for example, to easily understand whether the coffee beans are about to catch fire. In turn, in the aforementioned example of the two batches of coffee beans labelled as belonging to the same type of coffee but in reality having different cellular structures, this makes it possible to intervene on the batch of coffee that is not roasting correctly, quickly changing the operating parameters of the device 10 so as to make the coffee beans vibrate according to a reference roasting curve (sound quantity versus time).

The Applicant has therefore observed that each type or mixture of coffee beans can be characterised both by a roasting curve of temperature versus time and by a roasting curve of a sound quantity (for example, the sound pressure P expressed in Pascals) versus time.

Based on this observation, the Applicant has found that the roasting process can be controlled (by adjusting the operating parameters of the roasting device 10) obtaining—instant by instant—the temperature measured by the temperature sensor 11 and a sound quantity of the sound detected by the two sound sensors 16 and carrying out a continuous adjustment of the operating parameters of the device 10 so that the temperature and the sound quantity obtained reproduce the reference roasting curves.

According to a preferred embodiment, whenever a batch of a predetermined type or mixture of coffee is loaded into the reactor 12, the control device 20 is therefore configured to obtain the predetermined type or mixture of coffee to which the batch belongs (for example through insertion of suitable input data by the user and reading of such data). After this, the control device 20 is adapted for retrieving from the database 26, for the predetermined type or mixture of coffee obtained: a roasting curve of temperature versus time (for example such as the curve C of FIG. 3), which provides theoretical reference values that the temperature measured by the temperature sensor 11 must reproduce over time during a predetermined roasting time; a roasting curve of sound pressure versus time (for example such as curve A of FIG. 2, better detailed hereinafter), which provides theoretical reference values that the sound pressure of the sound detected by the two sound sensors 16 must reproduce over time during the predetermined roasting time; and curves of values for the operating parameters of the device 10, which provide the theoretical reference values that such parameters (for example the temperature of the air heated by the burner 13, the rotation speed of the drum or of the mixing blades of the reactor 12 and the speed of the air flow generated by the fan 15) must take over time during the predetermined roasting time to reproduce the two roasting curves of temperature versus time and of sound pressure versus time.

Once such data is recovered from the database 26, the control device is adapted for setting the operating parameters of the device 10 according to the theoretical reference values that such parameters must take at the start of the predetermined roasting time. After this, the control device is adapted for actuating the burner 13, the reactor 12 and the fan 15 according to the operating parameters thus set so as to start the roasting process of the coffee beans.

Once the roasting process has started, the control device 20 is adapted for continuously controlling, in feedback, the operation of the roasting device 10, in particular through the steps of:

obtaining, instant by instant (for example every tenth of a second), the value of the sound pressure of the sound detected by the two sound sensors 16;

comparing the value of the sound pressure obtained at each instant with the value that the sound pressure takes at said instant in the roasting curve of sound pressure versus time;

obtaining, instant by instant, the temperature measured by the temperature sensor 11;

comparing the temperature obtained at each instant with the value that the temperature takes, at said instant, in the roasting curve of temperature versus time;

adjusting, instant by instant, the operating parameters of the roasting device 10 as a function of the result of said comparisons.

In particular, as stated above, the adjustment step is carried out so as to ensure that the measured temperature and sound pressure values reproduce the respective theoretical roasting curves.

The adjustment step is continued until the comparison steps show that the roasting of the coffee beans has occurred. At this point, the control device is adapted for unloading the product from the reactor 12 so as to stop the roasting process.

In a preferred embodiment, the control device 20 is also adapted for obtaining, instant by instant, the sound frequency of the sound emitted by the coffee beans and comparing it with the value that the sound frequency takes, at said instant, in a roasting curve of sound frequency versus time (not shown). Considering that such a curve represents a digital fingerprint of each type of coffee, allowing the type or mixture of coffee to which the granules being roasted belong to be unequivocally identified, this comparison is useful for verifying that the type or mixture of coffee for which the operation of the roasting device 10 has been set (taking the curves associated with such a type of coffee from the database 26) is actually the type or mixture of coffee to which the batch of coffee being roasted belongs. In the case of mismatching, or, in other words, if the sound frequency measured over time does not reproduce the theoretical curve of sound frequency versus time, it means that the coffee belongs to a different type or mixture of coffee from the type/mixture of coffee for which the operation of the roasting device 10 has been set. This could happen, for example, due to incorrect insertion of input data by the user or because the coffee beans—despite being labelled as belonging to a certain type/mixture of coffee—have different cellular structure (for example because they come from a different harvest). In this case, the control device 20 is preferably adapted for selecting from the database 26 the most appropriate curves to be used for performing feedback control of the roasting device 10 during the roasting of such coffee beans.

Preferably, in the present description and claims, the expression "instant by instant" is used to indicate instants of detection of a process carried out continuously, for example every tenth of a second.

Preferably, the temperature sensor 11 has a sensitivity such as to detect even very small temperature variations (for example of 0.05° C.). Moreover, the sound sensors 16 have a high sensitivity, for example equal to 15 mV/Pa in the case of a microphone or 100 mV/g in the case of an accelerometer. This makes it possible to reproduce the slope of the roasting curves with substantial continuity.

The aforementioned step of adjusting, instant by instant, the operating parameters of the roasting device 10 is carried out through a suitable algorithm. Such an algorithm establishes, for example, the direction (in other words whether to increase or decrease the value of the parameters), the amount (in other words, how much the value of the parameters has to be changed) and the adjustment priority (in other words on which one(s) of the various parameters to intervene first) as a function of the result of the aforementioned comparisons. For example, as far as the adjustment priority of the operating parameters is concerned, the algorithm can be configured so that—if the temperature detected at a given instant by the temperature sensor 11 is less than the corresponding theoretical value in the respective roasting curve—the control device 20 is adapted for intervening first on the hot air temperature, then—if necessary—on the speed of the air flow generated by the fan 15 and, finally, also on the speed of the rotating drum or of the mixing blades of the reactor 12. Moreover, as far as the direction and the amount of the adjustment of the operating parameters is concerned, when the temperature detected is lower than the theoretical temperature, the algorithm can be configured so as to increase the values of such parameters by a predetermined amount as a function of the difference determined between detected temperature and theoretical temperature.

In a preferred embodiment, the control device 20 is adapted for performing feedback control of the operation of the roasting device 10, also through the steps of:
  determining, instant by instant, the sound energy released by the coffee beans up to that instant;
  comparing the energy determined at each instant with the value that the sound energy takes at said instant in a roasting curve of sound energy versus time;
  determining, instant by instant, the heat transferred to the coffee beans up to that instant;
  comparing the heat determined at each instant with the value that the transferred heat takes at said instant in a roasting curve of transferred heat versus time; and
  adjusting, instant by instant, the operating parameters of the roasting device 10 also as a function of the result of said comparisons.

For this purpose, once the predetermined type of coffee to which the coffee beans of the batch loaded in the roasting device 10 belong has been ascertained, the control device 20 is adapted for retrieving from the database 26: a respective roasting curve of accumulated sound energy versus time, which provides theoretical reference values that the sound energy accumulated by the sound detected by the temperature sensor 11 must reproduce over time during a predetermined roasting time; and a respective roasting curve of transferred heat accumulated versus time, which provides theoretical reference values that the transferred heat accumulated must reproduce over time during the predetermined roasting time.

Instant by instant, the sound energy can be determined based on the sound pressure ascertained up to that instant. For example, the sound energy can be determined by calculating the integral of the sound pressure ascertained up to that instant (the latter being able to be represented by a curve such as the curve A of FIG. 2). The integral can, for example, be calculated over progressive time intervals (for example at 3 seconds, 30 seconds, 60 seconds etc.). An example of a curve indicative of the sound energy En versus time is shown in FIG. 2 as curve B.

In turn, instant by instant, the transferred heat can be determined based on the heating power of the burner 13 or based on the hot air temperature entering the reactor 12 and the hot air flow. For example, the transferred heat can be determined by calculating the integral of a curve representative of the heating power of the burner 13 versus time or based on the integral of a curve representative of the hot air temperature entering the reactor 12 versus time and of information relative to the hot air flow over time. The integral can, for example, be calculated over progressive time intervals (for example at 3 seconds, 30 seconds, 60 seconds etc.).

In FIG. 3, as well as the curve C, two examples of curves D and E are shown, respectively of heating power Q of the burner 13 and temperature T of the hot air entering the reactor 12 versus time t.

In this preferred embodiment, in which the adjustment, instant by instant, of the operating parameters of the roasting device 10 is also carried out based on the transferred heat and the sound energy, the aforementioned algorithm will preferably be configured to adjust the various operating parameters of the device 10 as a function of the overall result of the temperature, sound pressure, transferred heat and sound energy comparisons. A feedback control of the operation of the roasting device 10, based on an analysis of the transferred heat and of the sound energy released, as well as on an analysis of temperature and sound pressure, advantageously makes it possible to anticipate the adjustment of the operating parameters according to the transferred heat and the sound energy released. For example, if the sound energy released by the coffee beans is lower than the expected theoretical value, it can be provided to intervene quickly to increase the temperature of the heated air, even before detecting a decrease of the temperature ascertained with respect to the theoretical one. Moreover, such a type of control advantageously makes it possible to accurately adapt the amount of the adjustment of the operating parameters. In particular, this is carried out in an inversely proportional manner to the values of transferred heat and sound energy calculated. For example, indeed, in the case of detection of a lower ascertained temperature than the theoretical value, it is possible to provide to increase the temperature of the heated air by a greater or smaller amount depending on whether the transferred heat and/or sound energy released are smaller or greater than the expected theoretical values. Moreover, from an analysis of the heat transferred to the coffee beans it is possible to establish whether the chemical transformation taking place is in an endothermal or exothermal phase. In the case of detection of a lower ascertained temperature with respect to the theoretical value, it is thus possible to provide to increase the temperature of the heated air by a more or less high amount depending on whether the chemical transformation is in endothermal or exothermal phase. Moreover, thanks to the adjustment carried out based on both heat and sound variables, there is a control which is not constrained by the heat energy accumulated by the reactor 12 (in other words not constrained by whether the reactor 12 is more or less hot or cold at the start of the roasting of a new batch of coffee).

In a preferred embodiment, the aforementioned steps of ascertaining, instant by instant, the value of the sound pressure of the sound detected by the sound sensors 16 and the sound energy released by the coffee beans up to that instant are carried out by acquiring in real time the signal coming from the two sound sensors 16 and carrying out the following processing operations:
  conversion of the signal in output from the two sound sensors 16 into engineering units (for example Pascals)
  bandpass filtering of the signal with settable band frequencies (typically from 7.500 to 40.000 Hz)
  calculation of the rms (root mean square) expressed in (Pa) for portions of signal of settable duration (typically 100 ms)
  calculation of the peak value (Pa) for portions of signal of settable duration (typically 100 us)

calculation of the difference between peak value and rms value, instant by instant, and extraction of the 99th percentile level on a movable window of settable duration (typically 100 ms)

from measurements carried out in real-time and expressed in Pa (able to be represented by a curve such as the curve A' of FIG. 2), extraction of the levels (expressed in Pa) of the peaks that exceed a predetermined and settable threshold level (typically above 0.5 Pa) the duration of which is greater than an interval that can also be set and expressed in number of detection instants (typically 3)

interpolation of the aforementioned peaks so as to obtain, instant by instant, the values of the sound pressure of the sound detected by the two sensors 16 (able to be represented by a curve such as the curve A of FIG. 2), to then be compared with the respective theoretical reference values instant by instant, calculation of the level in Pa of the peak and sum with the previous levels in energy mode (sum of the squares) so as to obtain, instant by instant, the values of the sound energy released by the coffee beans up to that instant (able to be represented by a curve such as the curve B of FIG. 2), to then be compared with the respective theoretical reference values.

As a function of the parameters of the roasting process and the characteristics of the product such curves take different shapes both in terms of speed of growth (during the typical two noise emission steps) and in terms of absolute values. It is also possible to calculate the derivative of the aforementioned curve B to represent the speed of the process.

From the description that has been made it can be understood that the database 26 is adapted for storing a plurality of predetermined types of coffee and, for each of them, a respective roasting curve of temperature versus time, a respective roasting curve of sound pressure versus time, a respective roasting curve of sound energy versus time, a respective roasting curve of transferred heat versus time, a respective roasting curve of sound frequency versus time and respective curves of values for the operating parameters of the device 10, which provide, as a function of time, theoretical reference values for such parameters (for example the temperature of the air heated by the burner 13, the rotation speed of the rotating drum or of the mixing blades of the reactor 12 and the speed of the air flow generated by the fan 15).

In a preferred embodiment of the invention, the control device 20 is preferably adapted for automatically updating the database 26 according to a self-learning process. In particular, the control device 20 is preferably adapted for storing, at the end of each roasting process of a batch of coffee, the roasting curves of temperature, sound pressure, transferred heat and energy released as well as the curves of values for the operating parameters of the device 10 which have actually been used in the roasting process that has just ended. Such curves will be associated in the database 26 in association with the type of coffee of the batch just roasted to replace pre-existing curves with more updated curves or to add a new type of coffee in the database 26. Concerning this, it should be observed that if a batch of coffee belonging to a new type or mixture of coffee (in other words, which is not present in the database 26) is loaded into the reactor 12, the control device 20—knowing the roasting curves C, A, B, D of temperature, sound pressure, transferred heat and energy released (for example because they are provided as input data by a user) for such a type/mixture of coffee—will control the roasting process based on curves of values for the operating parameters of the device 10 which are relative to similar types/mixtures of coffee (selected based on predetermined criteria); after this it will store the curves actually used during the roasting process to characterise the aforementioned type of coffee in the database 26.

According to the method and apparatus of the invention, the roasting is thus carried out through a continuous feedback control of the operating parameters of the roasting device 10, based on heat and sound variables (temperature, sound pressure, transferred heat and sound energy) derived from the coffee beans being roasted. The control is advantageously carried out both based on instantaneous values of the heat and sound variables and based on tendential values determined over settable time periods. This advantageously makes it possible to roast the coffee (or similar food product) in an extremely accurate and reliable manner, according to a procedure that is capable of continuously adapting the operation of the roasting device 20 to the actual evolution of the chemical transformation under way in the coffee beans.

The invention claimed is:

1. A method for roasting a food product, comprising the steps of:

loading a batch of a predetermined food product type in a roasting device, the predetermined food product type having a first set of reference roasting curves including at least a first sound quantity references roasting curve of sound quantity versus time;

setting, by way of a control device, operating parameters of the roasting device according to initial reference values for said predetermined food product type to initiate a heating process for the food product, and continuously monitoring said operating parameters during the entire heating process;

performing, by said control device, a continuous feedback control of the roasting device during the entire heating process, comprising the steps of:

continuously obtaining, by at least one sound sensor, an actual value for a sound quantity associated with a sound emitted by the food product, wherein said sound includes both audible frequencies and ultrasound frequencies;

comparing the actual value of the sound quantity at a first point in time during the heating process with an expected value for the sound quantity at a corresponding point in time from the first sound quantity reference roasting curve;

continuously determining an actual cumulative sound energy released by the food product up to the first point in time; comparing the actual cumulative sound energy to an expected cumulative sound energy at the corresponding point in time from a reference roasting curve of expected sound energy versus time, which is associated with said predetermined food product type; continuously adjusting the operating parameters of the roasting device depending on the result of said comparisons of the actual to expected sound quantity value, wherein said comparison is and the actual to expected cumulative sound energy repeated throughout the entire heating process;

continuously monitoring a frequency of the sound emitted by the food product and identifying the food product type depending on the frequency obtained over time, wherein the identified food product type has a second set of reference roasting curves including at least a second sound quantity reference roasting curve of sound quantity versus time;

determined whether the predetermined food product type matches the identified food product type based on the frequency of the sound emitted by the food product; and when the predetermined food product type does not match the identified food product type, selecting the second sound quantity reference roasting curve, and conducting further comparisons of a second actual value of the sound quantity at a second time during the heating process with a second expected value for the sound quantity at a second corresponding point in time from the second sound quantity references roasting curve.

2. The method according to claim 1, wherein the heating of the product is carried out by exposing the product to a heated air flow.

3. The method according to claim 2, wherein said operating parameters of the roasting device comprise at least one of: hot air temperature and hot air flow speed.

4. The method according to claim 2, wherein the roasting device comprises a reactor into which the food product is loaded, and said operating parameters comprise at least one of: hot air temperature, hot air flow speed and rotation speed of at least one rotating member of the reactor.

5. The method according to claim 1, wherein said actual sound quantity value is indicative of at least one of a sound pressure and an intensity of the sound emitted by the food product.

6. The method according to claim 1, wherein the first set of reference roasting curves further includes at least a first actual food product temperature reference roasting curve of food product temperature versus time, and wherein the step of performing a continuous feedback control of the roasting device during the entire heating process further comprises the steps of:

continuously obtaining, by a temperature sensor, an actual temperature of the food product at the first point in time during the heating;

continuously comparing the actual food product temperature with an expected food product temperature at the corresponding point in time from the first food product temperature reference roasting curve; and wherein the step of continuously adjusting the operating parameters of the roasting device is also carried out based on the result of the comparison of the actual food product temperature to the expected food product temperature.

7. A method for roasting a food product, comprising the steps of:

loading a batch of a predetermined food product type in a roasting device;

setting, by way of a control device operating parameters of the roasting device according to initial reference values for said predetermined food product type to initiate a heating process for the food product and continuously monitoring said operating parameters during the entire heating process;

performing, by said control device, a continuous feedback control of the roasting device during the entire heating process, including evaluation of a chemical transformation occurring in the food product, comprising the steps of:

continuously obtaining, by at least one sound sensor, an actual value for a sound quantity associated with a sound emitted by the food product, wherein said sound includes both audible frequencies and ultrasound frequencies;

comparing the actual value of the sound quantity at a first point in time with an expected value of the sound quantity at a corresponding point in time from a reference roasting curve of the expected value of the sound quantity versus time associated with said predetermined food product type, wherein said actual and expected values of the sound quantity are indicative of a sound pressure or intensity of the sound emitted by the food product;

continuously determining an actual cumulative sound energy released by the food product up to the first point in time;

comparing the actual cumulative sound energy to an expected cumulative sound energy at the corresponding point in time form a reference roasting curve of expected cumulative sound energy versus time, which is associated with said predetermined food product type;

continuously determining, a current state of the chemical transformation occurring in the food product depending on the result of the comparisons of the actual to expected sound quantity and the actual to expected cumulative sound energy;

determining an amount of required adjustment to the operating parameters and a priority of adjustment to the operating parameters, based at least in part on the current state of the chemical transformation in the food product; and continuously adjusting the operating parameters of the roasting device based on the amount of required adjustment to the operating parameters, and the priority of adjustment to the operating parameters.

8. A method for roasting a food product, comprising the steps of:

loading a batch of a predetermined food product type in a roasting device;

setting, by way of a control device operating parameters of the roasting device according to initial reference values for said predetermined food product type to initiate a heating process for the food product and continuously monitoring said operating parameters during the entire heating process;

performing, by said control device, a continuous feedback control of the roasting device during the entire heating process, including evaluation of a chemical transformation occurring in the food product comprising the steps of:

continuously obtaining, by at least one sound sensor, an actual value for a sound quantity associated with a sound emitted by the food product, wherein said sound includes both audible frequencies and ultrasound frequencies;

comparing the actual value of the sound quantity with an expected value of the sound quantity value at a first point in time from a said reference roasting curve of the expected value of the sound quantity versus time associated with said predetermined food product type;

continuously calculating an actual cumulative amount of heat transferred to the food product up to the first point in time;

comparing the actual cumulative amount of heat transferred to the food product to an expected cumulative amount of heat transferred at a corresponding point in time from a reference roasting curve of the expected cumulative amount of transferred heat versus time associated with said predetermined food product type; continuously determining, by said at least one sound sensor, an actual cumulative sound energy released by the food product up to the first point in time; comparing the actual cumulative sound energy with an expected cumulative sound energy at a corresponding point in time from a reference roasting curve of expected cumulative sound energy versus time for said predetermined food type;

continuoulsy determining a state of the chemical transformation occurring in the food product depending on the result of the comparisons of the actual to expected value of the sound quantity, the actual to expected cumulative amount of transferred heat, and the actual to expected cumulative sound energy;

continuoulsy determining an amount of required adjustment to the operating parameters and a priority of adjustment to the operating parameters, based at least in part on a current state of the chemical transformation in the food product, and continuously adjusting the operating parameters of the roasting device based on the amount of required adjustment to the operating parameters, and the priority of adjustment to the operating parameters.

9. The method according to claim 1, wherein the food product comprises at least one of coffee beans, barley grains, and nut pieces.

10. The method according to claim 1, further comprising a step of storing, by said control device, all adjustments of the operating parameters of the roasting device made during said heating process in a database, and associating said adjustments of the operating parameters with said predetermined food product type as predetermined reference values for said operating parameters after completion of the heating process.

11. The method according to claim 7, wherein the step of continuously determining the sound energy further includes calculating an integral of a measured sound pressure up to the first point in time.

12. The method according to claim 7, wherein performing the continuous feedback control further comprises the steps of:

continuously determining an actual cumulative amount of heat transferred to the food product up to the first point in time;

comparing the actual cumulative amount of heat transferred to the food product to an expected cumulative amount of heat transferred at a corresponding point in time from a reference roasting curve of the expected cumulative amount of transferred heat versus time for said predetermined food product type; and wherein the step of continuously determining the current state of the chemical transformation occurring in the food product is also carried out based on the result of the comparison of the actual to expected cumulative amount of transferred heat.

13. The method according to claim 8, wherein performing the continuous feedback control further comprises a step of determining whether the chemical transformation occurring in the food product is in an endothermal or exothermal phrase based on the actual cumulative amount of heat transferred to the food product.

14. The method according to claim 13, wherein the step of continuously determining the amount of required adjustment to the operating parameters and the priority of adjustment to the operating parameters, is also carried out based on whether the chemical transformation occurring in the food product is determined to be in an endothermal or exothermal phrase.

15. The method according to claim 12, wherein performing the continuous feedback control further comprised the steps of:

continuously obtaining, by a temperature sensor, an actual temperature reached by the food product at the first point in time during the heating;

comparing the actual food product temperature with an expected food product temperature at a corresponding point in time from a reference roasting curve of expected food product temperature versus time for said predetermined food product type, and wherein the step of continuously determining the state of the chemical transformation occurring in the food product is also carried out based on the result of the comparison of the actual to expected food product temperature.

16. The method according to claim 15, further comprising a step of storing, by said control device, all obtained and determined actual values of sound quantity, food product temperature, cumulative sound energy, and cumulative amount of transferred heat in a database or more corresponding reference roasting curves for said predetermined food product type.

* * * * *